United States Patent
Edynak et al.

(10) Patent No.: US 10,662,805 B2
(45) Date of Patent: May 26, 2020

(54) CONTROL RING FOR A STAGE OF VARIABLE-PITCH VANES FOR A TURBINE ENGINE

(71) Applicant: SAFRAN AIRCRAFT ENGINES, Paris (FR)

(72) Inventors: Jérémy Edynak, Moissy-Cramayel (FR); Olivier Bazot, Moissy-Cramayel (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 16/445,034

(22) Filed: Jun. 18, 2019

(65) Prior Publication Data
US 2019/0330996 A1 Oct. 31, 2019

Related U.S. Application Data

(63) Continuation of application No. 15/533,529, filed as application No. PCT/FR2015/053182 on Nov. 24, 2015.

(30) Foreign Application Priority Data

Dec. 9, 2014 (FR) .................................... 14 62120

(51) Int. Cl.
*F01D 17/16* (2006.01)
*F01D 25/28* (2006.01)
(Continued)

(52) U.S. Cl.
CPC ........... *F01D 17/162* (2013.01); *F01D 17/14* (2013.01); *F01D 17/16* (2013.01); *F01D 25/28* (2013.01);
(Continued)

(58) Field of Classification Search
CPC ........ F01D 17/162; F01D 17/12; F01D 17/14; F01D 17/16; F04D 29/563; F04D 27/002;
(Continued)

(56) References Cited

U.S. PATENT DOCUMENTS 2,858,104 A * 10/1958 Kelk ....................... F01D 11/22
                                                  415/190
3,037,292 A * 6/1962 Schuler ................ G01B 5/0004
                                                   33/803
(Continued)

FOREIGN PATENT DOCUMENTS

EP        0 375 593 A1    6/1990
EP        1 696 134 A2    8/2006
(Continued)

OTHER PUBLICATIONS

International Search Report dated Mar. 18, 2016, issued in corresponding International Application No. PCT/FR2015/053182, filed Oct. 14, 2014, 6 pages.

(Continued)

*Primary Examiner* — Sizo B Vilakazi
*Assistant Examiner* — Brian R Kirby
(74) *Attorney, Agent, or Firm* — Christensen O'Connor Johnson Kindness PLLC

(57) ABSTRACT

A control ring for a stage of variable-pitch vanes for a turbine engine includes at least one member for bearing on a casing and means for fixing the member. The member includes a bushing with an axial bore for the passage of the member or an element for supporting the member. A through-slot opens into the bore and allows for substantial radial deformation of the bushing. The member further includes an outer thread for screwing the bushing into a complementary thread of a hole in the body, thereby deforming the bushing. The member or support can be mounted and (Continued)

moved inside the bore, to a second position, in which the bushing is radially constrained and is tightly mounted on the member or support, which is thus immobilized in relation to the bushing.

14 Claims, 2 Drawing Sheets

(51) Int. Cl.
  *F01D 17/14* (2006.01)
  *F16B 5/02* (2006.01)
  *F04D 29/56* (2006.01)

(52) U.S. Cl.
  CPC .......... *F04D 29/563* (2013.01); *F16B 5/0258* (2013.01); *F05D 2230/644* (2013.01); *F05D 2240/128* (2013.01); *F05D 2250/292* (2013.01); *F05D 2250/37* (2013.01); *F05D 2260/30* (2013.01); *F05D 2260/31* (2013.01); *F16B 5/0233* (2013.01); *Y02T 50/672* (2013.01)

(58) Field of Classification Search
  CPC .......... F04D 29/0246; F05D 2240/128; F05D 2230/644; F05D 2260/30; F05D 2260/31; F05D 2250/37; F05D 2250/292; Y02T 50/672; F16B 5/0233; F02C 9/20
  USPC .................................................. 415/160, 161
  See application file for complete search history.

(56) References Cited

U.S. PATENT DOCUMENTS

| | | | | |
|---|---|---|---|---|
| 3,887,990 | A * | 6/1975 | Wilson | B23P 11/02 29/450 |
| 4,330,234 | A * | 5/1982 | Colley | F01D 11/22 415/127 |
| 4,925,364 | A * | 5/1990 | Das | F01D 17/162 415/150 |
| 5,096,375 | A * | 3/1992 | Ciokailo | F01D 11/22 415/127 |
| 5,161,928 | A * | 11/1992 | Burdick, Jr. | F16B 9/026 403/371 |
| 5,224,824 | A * | 7/1993 | Eng | F01D 25/246 415/173.1 |
| 5,387,080 | A * | 2/1995 | Bouhennicha | F01D 17/162 415/150 |
| 5,848,874 | A * | 12/1998 | Heumann | F01D 9/042 415/189 |
| 6,086,327 | A * | 7/2000 | Mack | F01D 17/162 384/273 |
| 6,131,712 | A * | 10/2000 | Rhodenizer | B60T 17/223 188/3 H |
| 6,884,025 | B2 * | 4/2005 | Pickens | F01D 17/16 415/160 |
| 7,244,098 | B2 * | 7/2007 | Bromann | F01D 17/162 415/160 |
| 7,625,169 | B2 * | 12/2009 | Manzoori | F01D 11/22 415/14 |
| 7,677,866 | B2 * | 3/2010 | Bromann | F01D 17/162 415/160 |
| 2004/0081554 | A1 * | 4/2004 | Bruce | F01D 17/162 415/160 |
| 2009/0116954 | A1 * | 5/2009 | Bouru | F01D 17/162 415/125 |
| 2009/0162192 | A1 * | 6/2009 | McCaffrey | F01D 17/162 415/160 |
| 2009/0190993 | A1 * | 7/2009 | De Gelis | F16B 5/0233 403/47 |
| 2009/0263180 | A1 * | 10/2009 | De Gelis | F16B 5/0233 403/22 |
| 2012/0195751 | A1 * | 8/2012 | Gasmen | F01D 17/162 415/213.1 |
| 2016/0090856 | A1 * | 3/2016 | Klauke | F01D 17/14 415/148 |
| 2017/0356305 | A1 * | 12/2017 | Mena-Dominguez | F01D 25/162 |

FOREIGN PATENT DOCUMENTS

| | | |
|---|---|---|
| EP | 1 820 942 A1 | 8/2007 |
| FR | 2 882 577 A1 | 9/2006 |
| JP | S3813176 Y2 | 6/1963 |
| JP | H02215936 A | 8/1990 |

OTHER PUBLICATIONS

Written Opinion of the International Searching Authority dated Mar. 18, 2016, issued in corresponding International Application No. PCT/FR2015/053182, filed Nov. 24, 2015, 5 pages.
Written Opinion of the International Searching Authority dated Mar. 18, 2016, issued in corresponding International Application No. PCT/FR2015/053182, filed Nov. 24, 2015, 6 pages.
International Preliminary Report on Patentability dated Jun. 13, 2017, issued in corresponding International Application No. PCT/FR2015/053182, filed Nov. 24, 2015, 1 page.
Japanese Office Action dated Oct. 1, 2019, issued in corresponding Japanese Application No. 2017-529995, 4 pages.

* cited by examiner

CONTROL RING FOR A STAGE OF VARIABLE-PITCH VANES FOR A TURBINE ENGINE

CROSS-REFERENCES TO RELATED APPLICATIONS

This application is a continuation of U.S. application Ser. No. 15/533,529, filed Jun. 6, 2017 which is a National Stage of WOSN PCT/FR2015/053182, filed Nov. 24, 2015, which claims priority to FRSN 1462120, filed Dec. 9, 2014, the disclosures of which are hereby expressly incorporated by reference herein in their entirety.

TECHNICAL FIELD

The present invention relates to a control ring for a stage of variable-pitch vanes for a turbine engine.

PRIOR ART

The prior art includes in particular EP-A2-1 696 134, EP-A1-1 820 942, FR-A1-2 882 577 and EP-A1-0 375 593.

A stage of this type comprises an annular row of variable-pitch stator vanes (also referred to as VSV, an acronym for Variable Stator Vanes) that are supported by an outer annular casing, generally of a compressor of the turbine engine. Each vane comprises a blade, which is connected at its radially outer end, by a plate having a substantially circular contour, to a radial cylindrical pivot that defines the axis of rotation of the vane and is rotationally guided in a corresponding hole in the outer casing. The radially inner end of the blade of each vane generally comprises a second cylindrical pivot extending along the axis of rotation of the vane and rotationally guided in a hole in an inner casing of the compressor.

The radially outer end of the outer pivot of each vane is connected by a connecting rod to a control ring rotated about the outer casing by cylinder actuation means or similar actuation means. The rotation of the control ring is transferred by the connecting rods to the outer pivots of the vanes and causes said vanes to rotate about their axes.

The angular pitch of the stator vanes in a turbine engine is intended to adapt the geometry of the compressor to its operating point and in particular to optimise the efficiency and the surge margin of this turbine engine, and to reduce the fuel consumption thereof in the various flight configurations.

Each of these vanes can be rotated about its axis between a first "open" or "fully-open" position, in which each vane extends substantially in parallel with the longitudinal axis of the turbine engine, and a second "closed" or "almost-closed" position, in which the vanes are inclined relative to the axis of the turbine engine and thus reduce the air-flow cross section through the vane stage.

The control ring has to be centred and rotationally guided about its axis of rotation. In the prior art, the outer casing comprises tracks, on which the inner periphery of the ring can engage through friction. The casing comprises members, such as pads, for bearing and being guided on the tracks. The pads are used, on the one hand, to guarantee the concentricity of the ring around the casing by adjusting pad/casing clearances and, on the other hand, to limit the deformation of the ring caused by the aerodynamic forces on the variable-pitch vanes acting on the kinematics during operation.

Indeed, it is important for cold radial clearances to be provided between the pads and the tracks of the casing in order to allow thermal expansion of the casing and to allow good pitch kinematics in all the engine configurations. However, it has been noted, particularly in the case of single-cylinder actuation means, that, depending on the opening and closing ranges of the variable-pitch vanes, the cold clearances cause off-centring of the control ring in relation to the casing, which negatively affects the precision of the pitch. This off-centring heterogeneously uses the cold clearances according to the pitch angle.

The pads are fixed to the body of the ring by fixing means. It has already been proposed for the pads to be fixed by means of adjustment screws, each adjustment screw passing through a radial hole in the body of the ring and comprising a first radially inner threaded end screwed into a tapped hole in a pad and a second radially outer threaded end screwed into the ring, onto which a nut is screwed that rests against the body of the ring. The second threaded end has a standard pitch thread, whereas the first threaded end has a metric fine pitch thread that allows fine adjustment of the clearance under the pad. As this threaded connection is not locked, there is a clearance between the pad and the adjustment screw.

During operation, the presence of this clearance causes, under the action of the surrounding vibrations, a relative displacement between the parts, leading to the destruction of the threaded connection. Consequently, the pad function is no longer provided. Furthermore, this wear directly affects the pitch angle of the vanes during operation, which can affect the correct operation of the engine (surging in the event of a significant number of worn pads on the same stage).

The present invention proposes a simple, effective and economical solution to at least some of the aforementioned problems.

DISCLOSURE OF THE INVENTION

The invention proposes a control ring for a stage of variable-pitch vanes for a turbine engine, comprising an annular body intended to extend around a casing, means designed to be connected to pivots of said vanes, and means that are designed to cooperate with the casing so as to centre and guide said body and that comprise at least one member for bearing on said casing that is fixed to the body by fixing means, characterised in that said fixing means comprise at least one bushing which comprises:

an axial bore for the passage of said member or an element for supporting said member;

a through-slot opening into said bore and designed to allow a substantially radial deformation of the bushing; and an outer thread for screwing the bushing into a complementary thread of a hole in said body, said bushing being designed so that when it is screwed in it cooperates with said body so as to substantially radially deform from a first position, in which said member or support can be mounted and moved inside said bore, to a second position, in which said bushing is radially constrained and tightly mounted on said member or support, which is thus immobilised in relation to the bushing.

It is thus understood that screwing the bushing fixes the bearing member or its support in relation to the casing. In the loose or unscrewed position, the bushing is free and unconstrained and the inner diameter of its inner bore allows the member or the support to be mounted and moved, and it in particular allows it to be precisely positioned in relation to the casing. In the screwed and tightened position, the bushing is radially constrained and the inner diameter of its inner bore is restricted. The bushing is thus tightly mounted on the member or the support in order to immobilise it in relation to the casing in the precise position. This technology has the advantage of limiting the risk of damaging the ring by limiting the direct transmission of torque thereto.

The ring according to the invention can comprise one or more of the following features, taken in isolation or in combination with one another:

said member or support comprises a cylindrical rod axially engaged in said bore;

said member comprises at least one pad for bearing on the casing;

said pad is rigidly connected to said rod and is formed as a single piece with said rod, for example;

elastically deformable means are interposed between the pad and the body in order to urge said pad against said casing;

said elastically deformable means comprise at least one compression spring, for example a coil spring, mounted around said rod;

said bushing comprises at least one substantially frustoconical portion designed to cooperate with a frustoconical portion of said hole in said body for mounting the bushing;

said bushing comprises a cylindrical portion comprising said outer thread; and said body comprises means designed to be connected to actuation means with a view to rotating said body about a casing of the turbine engine.

The present invention further relates to a stage of variable-pitch vanes for a turbine engine, comprising an annular row of variable-pitch vanes each comprising a blade and a cylindrical pivot at its radially outer end, the stage further comprising an annular casing comprising mounting holes for the pivots of the vanes, characterised in that said pivots are connected by levers to a ring, as described above.

The present invention further relates to a turbine engine, characterised in that it comprises at least one ring or at least one stage, as described above.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE FIGURES

The invention will be better understood and further details, features and advantages of the invention will become more clearly apparent upon reading the following description, given by way of non-limiting example, and with reference to the accompanying drawings, in which.

DETAILED DESCRIPTION

Figure 1:
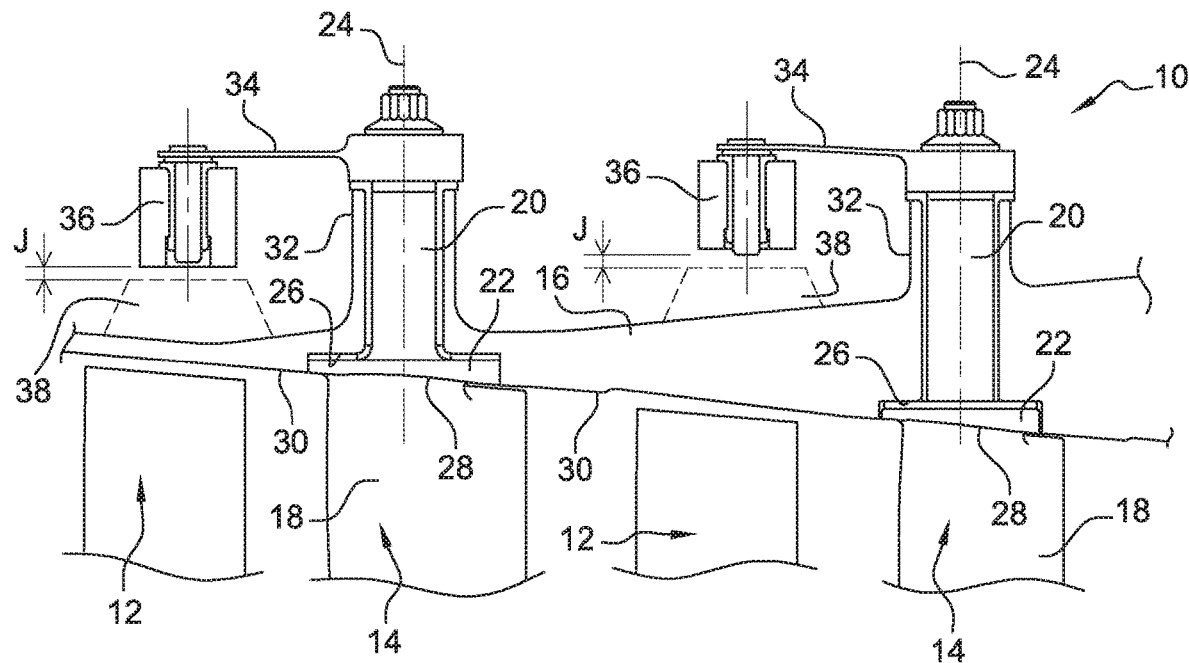
FIG. 1 is a partial schematic half-view in axial section of stages of variable-pitch vanes of a turbine engine.

FIG. 1 is a schematic axial sectional view of part of a high-pressure compressor 10 of a turbine engine, in particular an aircraft turbine engine, having a plurality of stages, each stage comprising an annular row of movable vanes 12 supported by the rotor (not shown) of the turbine engine and an annular row of fixed vanes 14 forming rectifiers supported by a casing 16 of the stator of the turbine engine, the angular orientation of the vanes 14 being adjustable in order to optimise the gas flow in the compressor 10.

Each vane 14 comprises a blade 18 and a radially outer cylindrical pivot 20 connected, by a disc or "plate" 22 extending perpendicularly to the axis 24 of the vane, in a corresponding housing 26 of the casing 16. The radially inner surface 28 of the disc is aligned with the inner wall 30 of the casing so as not to oppose the gas flow.

The cylindrical pivot 20 of each vane 14 extends inside a radial cylindrical chamber 32 of the casing 16 and its radially outer end is connected by a connecting rod 34 to a control ring 36, which surrounds the casing 16 and is associated with actuation means (not shown), allowing it to rotate in one direction or in the other direction about the longitudinal axis of the casing 16 in order to rotate the vanes 14 of an annular row about their axes 24.

The vanes 14 can be rotated about their axes 24 between a closed or almost-closed position and an open or fully-open position.

In the closed position, the blades 18 of the vanes are inclined relative to the longitudinal axis of the turbine engine and together define a minimum air-flow cross section in the duct. The vanes 14 are brought into this position when the turbine engine is at low speed or at idle speed, the flow rate of air flowing in the compressor thus having a minimum value.

In the open position, the blades 18 of the vanes extend substantially in parallel with the axis of the turbine engine such that the air-flow cross section between the blades is at a maximum. The vanes 14 are brought into this position when the turbine engine is operating full-out, the flow rate of air flowing in the compressor thus having a maximum value.

In the prior art, the casing 16 comprises projecting tracks 38 on its outer periphery for centring and guiding the rings 36, which tracks are shown schematically here by dashed lines. Each ring 36 surrounds its one or more guide tracks 38. Reference sign J denotes the cold radial clearances that are provided between a ring 36 and its one or more tracks 38. These clearances J have to be large enough to allow thermal expansion of the casing 16 but do not allow the angular positions of the vanes 14 to be precisely adjusted.

Figure 2:
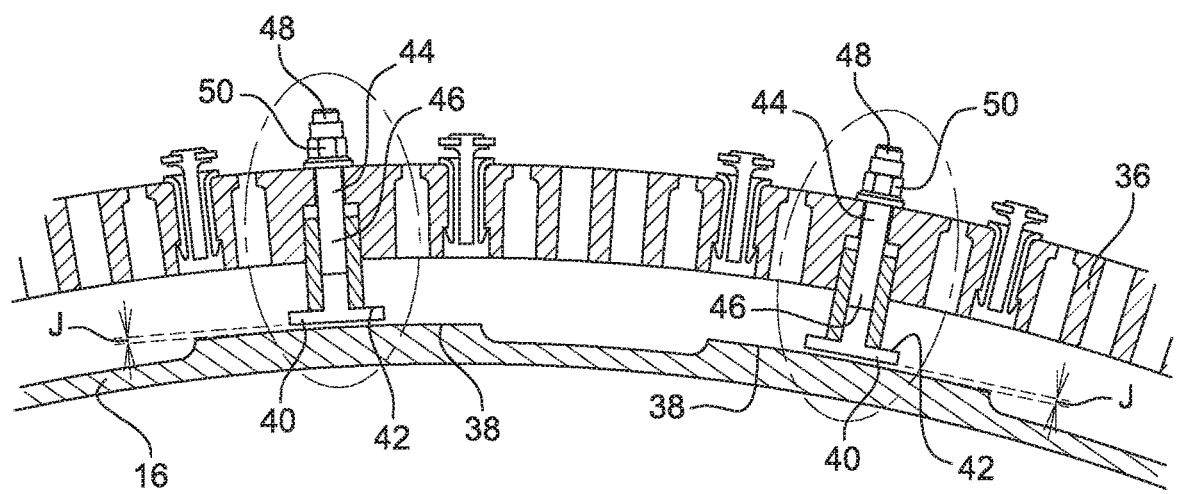
FIG. 2 is a partial schematic cross-sectional view of a control ring for variable-pitch vanes of a turbine engine, according to the prior art.

As is more clearly shown in FIG. 2, these clearances J are adjusted by means of guide pads 40 that are fixed to the body of the ring 36 and are designed to cooperate with the tracks 38 by bearing thereagainst and sliding thereon in order to guarantee the concentricity of the ring around the casing and to limit any deformation of the ring caused by the aerodynamic forces on the vanes 14 during operation.

In the prior art shown in FIG. 2, each pad 40 is supported by a support element 42 comprising a rectangular shaft engaged in a radial hole in the body of the ring 36. The support element 42 is fixed to the body of the ring by means of an adjustment screw 44 that extends substantially radially into the hole in the body of the ring and comprises a first radially inner threaded end 46 screwed into a tapped hole in the shaft of the support element 42 and a second radially outer threaded end 48 screwed into the ring, onto which a nut 50 is screwed, which rests against the body of the ring 36. The second threaded end has a standard pitch thread, whereas the first threaded end has a metric fine pitch thread that allows fine adjustment of the clearance J under the pad.

As this threaded connection is not locked, there is a clearance between the pad and the adjustment screw, which is problematic, as explained above.

The invention makes it possible to overcome this problem by virtue of new means for fixing the member or the guide pad on the body of the ring.

Figure 3:
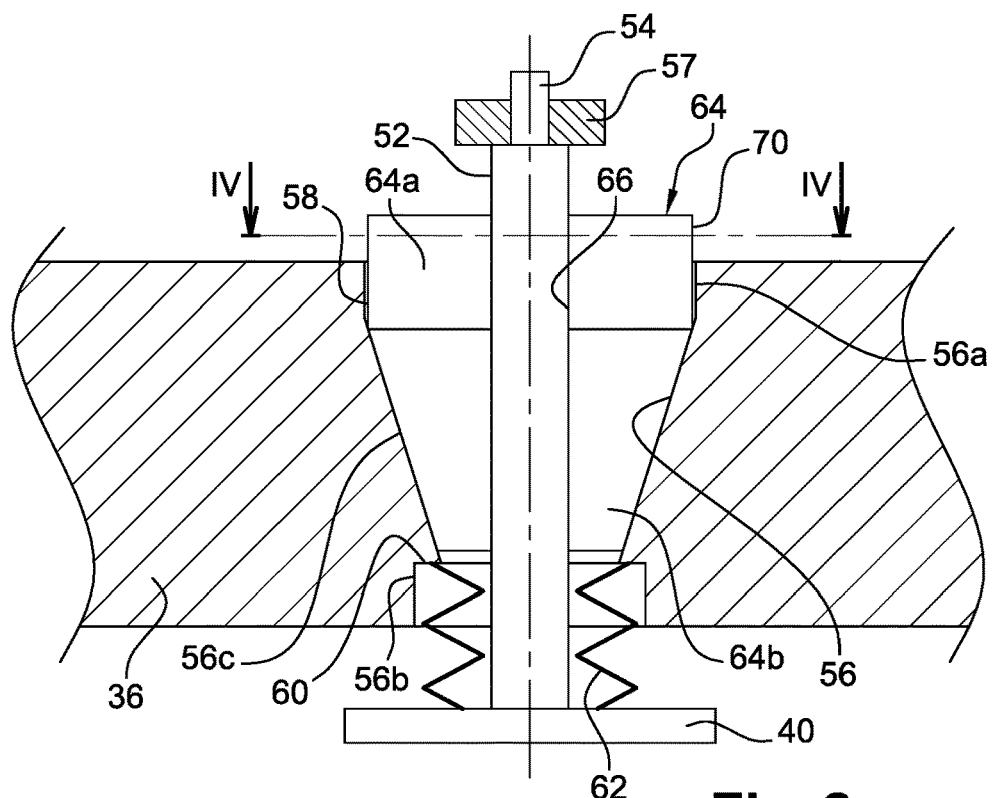
FIG. 3 is a partial schematic cross-sectional view of a control ring for variable-pitch vanes of a turbine engine, according to the invention.
Figure 4A:
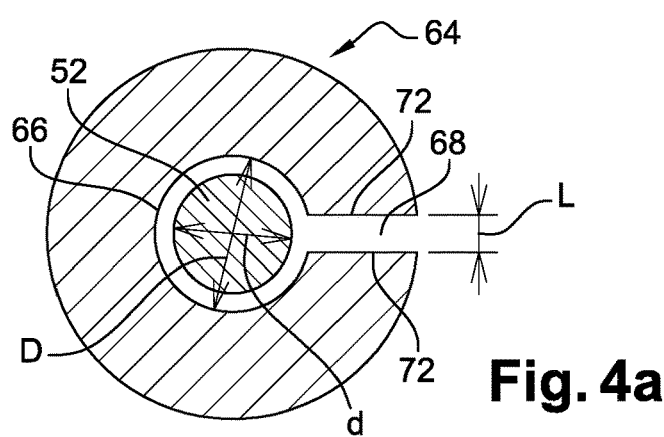
FIGS. 4a and 4b are schematic sectional views along the line IV-IV in FIG. 3 and respectively show two positions of the bushing of the fixing means according to the invention.
Figure 4B:
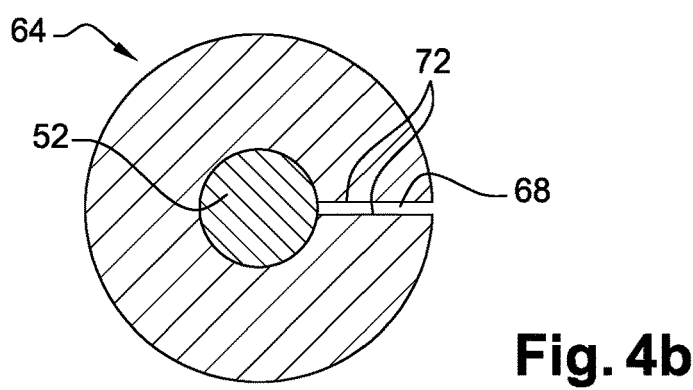

FIGS. 3, 4a and 4b show an embodiment of the invention, in which the elements that have already been described above are identified using the same reference numerals.

In this case, the control ring 36 comprises an annular body, which can be sectorised and formed of at least two sectors circumferentially arranged end-to-end and connected to one another.

As is the case in the prior art shown in FIGS. 1 and 2, the body of the ring 36 comprises radial holes, in which cylindrical pins are accommodated that are supported by the connecting rods. Each pin is generally centred and rotationally guided in a hole by at least one sleeve bearing mounted in the hole.

As previously described, the body of the ring 36 further comprises means for connecting to an actuator, which means can comprise, for example, a clevis bearing a spindle, on which an end of a piston rod of an actuator is articulated, when said actuator is a cylinder, for example.

The ring 36 further comprises members, such as pads 40, for bearing on the casing and in particular on tracks of the casing. In the example shown, each pad 40 is connected to a cylindrical rod 52 and is formed as a single piece with this rod 52. In a variant, the pad 40 can be supported by a support element, similar to that in FIG. 2. This support element will in this case be rigidly connected to the cylindrical rod 52 and will be formed as a single piece therewith, for example.

The cylindrical rod 52 is substantially smooth over its entire longitudinal extent. It is connected to the pad 40 by its radially inner end and comprises an outer thread 54 at its radially outer end. The rod 52 is engaged in a substantially radial hole 56 in the body of the ring 36, preferably radially from inside the ring.

A nut 57 is screwed onto the outer thread 54 of the rod 52 in order to prevent it from detaching from the body of the ring, as will be explained in more detail in the following.

In the example shown, the hole 56 in the body of the ring substantially comprises three successive axial segments 56a, 56b, 56c. The hole 56 comprises a first radially outer segment 56a that has a generally substantially cylindrical shape and comprises an inner thread 58. This segment 56a opens, at its radially outer end, onto the outer periphery of the body of the ring. The hole 56 comprises a second radially inner segment 56b that is substantially cylindrical and has a smaller diameter than that of the first segment 56a. This segment 56b opens, at its radially inner end, onto the inner periphery of the body of the ring. Finally, the hole 56 comprises a third intermediate segment 56c that is substantially frustoconical and extends between the segments 56a, 56b. The diameter of this segment radially decreases from the inside to the outside. The radially outer end of the segment 56c that has the largest diameter is connected to the radially inner end of the segment 56a and has substantially the same diameter as the segment 56a. The radially inner end of the segment 56c has a diameter that is less than that of the segment 56a and is connected thereto by an annular shoulder 60 that is radially oriented towards the inside. The segments 56a, 56b, 56c are substantially coaxial.

As can be seen in FIG. 3, an elastically deformable means, such as a compression spring 62, in this case a coil spring, is mounted between the body of the ring 36 and the pad 40 in order to urge said pad towards the casing and allow it to be centred relative to said casing. In this case, the spring 62 is mounted around the rod 52, coaxially thereto, and comprises a radially inner end which rests against a radially outer face of the pad 40, and a radially outer end which rests against the aforementioned shoulder 60. In this case, the spring 62 is accommodated at least in part in the segment 56b of the hole 56.

As can also be seen in the drawings, the longitudinal length or dimension of the rod 52 is greater than the radial dimension or thickness of the body of the ring. This length can be measured between the pad 40 and the thread 54 and corresponds to the length of the smooth cylindrical portion of the rod. Therefore, the rod can move in the radial direction relative to the body of the casing and is locked inwardly by abutting the nut 56 on the body of the casing and outwardly by abutting the pad 40 on said body (the pad 40 in this case having a transverse dimension that is greater than that of the hole). According to the invention, the means for fixing the pad 40 or its support element comprise a bushing 64, such as that shown in FIGS. 3, 4a and 4b.

The bushing 64 comprises:

an axial bore 66 for the passage of the rod 52;

a through-slot 68 opening into the bore 66 and designed to allow a substantially radial deformation of the bushing; and an outer thread 70 for screwing the bushing into the thread 58 of the segment 56a of the hole 56.

The bore 66 is of a generally cylindrical shape. Its diameter D is greater than the diameter d of a portion of the rod 52 (FIG. 4a), when the bushing 64 is in a free and unconstrained state. The bore 66 extends over the entire longitudinal dimension of the bushing 64 and opens out at the longitudinal ends of the bushing.

The slot 68 is of an elongate rectilinear shape and extends along the longitudinal axis of the bushing 64. It extends over the entire longitudinal extent of the bushing and over its entire radial thickness, including between the bore 66 and the peripheral outer surface of the bushing.

The slot 68 extends between two longitudinal edges 72 facing the bushing. These edges 72 are separated from one another by a distance L that corresponds to the width of the slot 68.

In the example shown, the bushing 64 comprises two adjacent segments 64a, 64b, namely an upper or radially outer segment 64a and a lower or radially inner segment 64b. The upper segment 64a has a generally cylindrical shape and comprises the outer thread 70. The lower segment 64b has a generally frustoconical shape, the diameter of which radially decreases from the outside to the inside and in a manner that substantially complements the segment 56c of the hole 56 in the body of the ring 36.

As can be seen in FIGS. 4a and 4b, the bushing 64 can deform in the radial direction and in particular can be radially constrained. It can be deformed from the free and unconstrained position, shown in FIG. 4a, to a constrained position, shown in FIG. 4b, in which the edges 72 have been brought closer together and the bore 66 has a diameter that corresponds to the diameter d of the rod 52. In this final position, the bushing 64 is radially tightened onto the rod 52 and radially immobilises the rod in relation to the body of the ring. The pad 40 is thus rendered immobile in relation to the body of the ring.

According to the invention, the bushing 64 is deformed by screwing it into the hole 56 in the body of the casing, as will be described in detail in the following.

The bushing 64 is engaged in the hole 56 in the body of the ring from outside and the segment 64a of the bushing is partially screwed into the thread 58 of the hole 56. The bushing is then in the position shown in FIG. 4*a*, i.e. in a free and unconstrained state. As explained above, the rod 52 is radially engaged in the hole 56 in the body of the ring from inside, as well as in the bore 66 in the bushing 64, until its thread 54 is located radially outside the bushing 64 and can receive the nut 57. The spring 62 is previously mounted around the rod 52, between the pad 40 and the shoulder 60 of the body of the ring. The ring 36 can then be mounted around the casing of the turbine engine so as to precisely adjust the aforementioned clearances J. These clearances are imposed by temporary shims that are interposed between the pads 40 and the tracks of the casing. Mounting these shims causes the spring 62 to compress, which urges the pad 40 against the shim and thus ensures that the clearance J corresponds exactly to the thickness of the shim that is used. The bushing 64 can then be screwed and tightened further in the hole 56, such that its segment 64*b* comes into abutment against the peripheral wall of the segment 56*c* of the hole, which results in a radial contraction of the bushing 64 and its transition into the position shown in FIG. 4*b*. The bushing 64 is then tightly mounted on the rod 52. The rod 52 and the pad 40 are then immobilised in this position by friction and the shim can be removed.

For example, the bushing 64 is made from metal or composite material.

The invention can also be adapted for pads under the connection bridges of sectors of the body of the ring, preferably by ensuring that the upper portion of the bushing does not project beyond the upper face of the control ring.

The implementation of this invention makes it possible to eliminate any wear in the pads that is currently observed in fleets, thus guaranteeing the proper operation of the engine.

The procedure for adjusting the clearances under pads is simplified in this case as the clearances no longer need to be adjusted by screwing and unscrewing the pad.

The embodiments of the invention in which an exclusive property or privilege is claimed are defined as follows:

1. A control ring for a stage of variable-pitch vanes for a turbine engine, comprising an annular body configured to extend around a casing, an actuator operably coupled the vanes and configured to selectively rotate each vane about a pivot, and a mounting assembly configured to cooperate with said casing to center and to guide said annular body, the mounting assembly comprising at least one member for bearing on the casing that is fixed to the annular body by a bushing, the bushing comprising:
    an axial bore for the passage of said bearing member and for supporting said bearing member;
    a through-slot opening into said bore and configured to allow a substantially radial deformation of the bushing;
    an outer thread configured to engage a complementary threaded hole in said annular body, said bushing configured to cooperate with said annular body so as to substantially radially deform from a first position, in which said bearing member can be mounted and moved inside said bore, to a second position, in which said bushing is radially constrained and is tightly mounted on said bearing member, wherein said bearing member is thus immobilized in relation to the bushing,
    said hole in said ring's annular body comprising an annular shoulder that is radially oriented towards the inside;
    wherein an elastically deformable element is interposed between said bearing member and said annular shoulder of the annular body's hole, such that said elastically deformable element urges said bearing member toward said casing.

2. The control ring according to claim 1, wherein said bearing member comprises a cylindrical rod axially engaged in said bore.

3. The control ring according to claim 2, wherein said bearing member comprises at least one pad configured to bear on the casing.

4. The control ring according to claim 3, wherein said pad is rigidly connected to said rod.

5. The control ring according to claim 2, wherein said elastically deformable element comprises at least one compression spring mounted around said cylindrical rod.

6. The control ring according to claim 1, wherein said bushing comprises at least one substantially frustoconical portion designed to cooperate with a frustoconical portion of said hole in said annular body for mounting the bushing.

7. The control ring according to claim 6, wherein said bushing comprises a cylindrical portion comprising said outer thread.

8. A stage of variable-pitch vanes for a turbine engine, comprising an annular row of variable-pitch vanes, each vane comprising a blade and a cylindrical pivot at a radially outer end of the vane, the stage further comprising an annular casing comprising mounting holes for the pivots of the vanes, wherein said pivots are connected by levers to a control ring according to claim 1.

9. A turbine engine, comprising at least one control ring according to claim 1.

10. The control ring according to claim 4, wherein said pad is formed as a single piece with said rod.

11. A turbine engine according to claim 9, further comprising at least one stage of variable-pitch vanes for a turbine engine, comprising an annular row of variable-pitch vanes, each vane comprising a blade and a cylindrical pivot at a radially outer end of the vane, the stage further comprising an annular casing comprising mounting holes for the pivots of the vanes, wherein said pivots are connected by levers to the at least one control ring.

12. A turbine engine, comprising at least one stage according to claim 8.

13. The control ring according to claim 1, wherein said elastically deformable element comprises a radially inner end which rest against a radially outer face of said bearing member, and a radially outer end which rests against said annular shoulder of the annular body's hole.

14. The control ring according to claim 1, wherein the mounting assembly provides a cold radial clearance between the casing and the at least one of said bearing member.

* * * * *

UNITED STATES PATENT AND TRADEMARK OFFICE
CERTIFICATE OF CORRECTION

PATENT NO. : 10,662,805 B2  
APPLICATION NO. : 16/445034  
DATED : May 26, 2020  
INVENTOR(S) : J. Edynak et al.

Page 1 of 1

It is certified that error appears in the above-identified patent and that said Letters Patent is hereby corrected as shown below:

In the Claims

| Column | Line | |
|---|---|---|
| 7 | 41 | Claim 1: Please change "coupled the" to -- coupled to the --. |

Signed and Sealed this  
Twenty-second Day of June, 2021

Drew Hirshfeld  
*Performing the Functions and Duties of the  
Under Secretary of Commerce for Intellectual Property and  
Director of the United States Patent and Trademark Office*